(12) United States Patent
Gu

(10) Patent No.: US 9,030,139 B2
(45) Date of Patent: May 12, 2015

(54) SYSTEM AND METHOD FOR CONTROLLING SPEED OF MOTOR

(71) Applicant: Samsung Electro-Mechanics Co., Ltd., Gyeonggi-do (KR)

(72) Inventor: Bon Young Gu, Gyeonggi-do (KR)

(73) Assignee: Samsung Electro-Mechanics Co., Ltd., Gyeonggi-Do (KR)

( * ) Notice: Subject to any disclaimer, the term of this patent is extended or adjusted under 35 U.S.C. 154(b) by 121 days.

(21) Appl. No.: 13/826,846

(22) Filed: Mar. 14, 2013

(65) Prior Publication Data

US 2014/0152203 A1    Jun. 5, 2014

(30) Foreign Application Priority Data

Nov. 30, 2012   (KR) .................. 10-2012-0137869

(51) Int. Cl.
    *H02P 23/00*    (2006.01)
(52) U.S. Cl.
    CPC .................................. *H02P 23/0036* (2013.01)
(58) Field of Classification Search
    CPC .................................................. H02P 23/0036
    USPC .................................. 318/400.2, 400.01, 700
    See application file for complete search history.

(56) References Cited

U.S. PATENT DOCUMENTS

| | | | | |
|---|---|---|---|---|
| 7,141,943 B2 * | 11/2006 | Song et al. | ............... | 318/400.34 |
| 7,336,045 B2 * | 2/2008 | Clermonts | ............... | 318/400.29 |
| 7,834,565 B2 * | 11/2010 | Armstrong | ................. | 318/254.1 |
| 8,446,120 B2 * | 5/2013 | Forster et al. | ................. | 318/503 |

FOREIGN PATENT DOCUMENTS

| | | |
|---|---|---|
| JP | 04-275091 A | 9/1992 |
| JP | 09-331692 A | 12/1997 |
| JP | 2002-238290 A | 8/2002 |
| JP | 2003-088156 A | 3/2003 |
| KR | 10-2008-0061642 A | 7/2008 |
| KR | 10-2010-0026649 A | 3/2010 |
| KR | 10-2010-0041794 A | 4/2010 |
| KR | 10-2012-0076724 A | 7/2012 |
| WO | 02-087066 A1 | 10/2002 |

OTHER PUBLICATIONS

KR 10-2012-0137869 Office Action dated Nov. 26, 2013; 4pgs.
KR 10-2012-0137869 Notice of Allowance dated Jan. 28, 2014; 2pgs.
JP 2013-243586 Office Action dated Sep. 30, 2014; 4pgs.

* cited by examiner

*Primary Examiner* — David S Luo
(74) *Attorney, Agent, or Firm* — Bracewell & Giuliani LLP; Brad Y. Chin

(57) ABSTRACT

Disclosed herein are a system and a method for controlling a speed of a motor. The method for controlling a speed of a motor includes: receiving a signal from a hall sensor of the motor to measure a current speed of the motor; comparing the current speed of the motor measured with a reference speed to calculate errors; outputting a speed control value of the motor based on the calculated errors; limiting the output speed control value to values within a predetermined range; controlling a duty or a phase of current applied to the motor according to the limited values within the predetermined range; and generating a motor driving signal based on the duty control or the phase control and applying the generated motor driving signal to the motor.

10 Claims, 5 Drawing Sheets

DESIGNATED DUTY OR DESIGNATED
SPEED OR MAXIMUM SPEED

SYSTEM AND METHOD FOR CONTROLLING SPEED OF MOTOR

CROSS REFERENCE(S) TO RELATED APPLICATIONS

This application claims the benefit under 35 U.S.C. Section 119 of Korean Patent Application Serial No. 10-2012-0137869 entitled "System And Method For Controlling Speed Of Motor" filed on Nov. 30, 2012, which is hereby incorporated by reference in its entirety into this application.

BACKGROUND OF THE INVENTION

1. Technical Field

The present invention relates to a system and a method for controlling a speed of a motor, and more particularly, to a system and a method for controlling a speed of a motor capable of maximizing efficiency of a motor by simultaneously controlling a duty value and a phase value in controlling a speed of a motor.

2. Description of the Related Art

As a method for controlling a speed of a motor, there are an open loop control method and a closed loop control method. As the open loop control method does not detect a current speed of a motor, the open loop control method may not accurately control the speed of the motor due to a change in surrounding environment. On the other hand, the closed loop control method may maintain a constant speed at all times as the control of the speed adaptively reacts to the surrounding environment. According to the related art, a method for controlling a speed of a motor based on a duty has been used. However, the method may not implement a maximum efficiency according to characteristics of a motor.

FIG. 1 is a diagram illustrating an example of a system for controlling a speed of a motor based on a closed loop control method according to the related art.

As illustrated in FIG. 1, the system for controlling a speed of a motor according to the related art is configured to include a speed measurement unit 107, a comparison unit 102, a speed control unit 103, a limiting unit 104, and a PWM generation unit 105.

As described above, when the system for controlling a speed of a motor according to the related art intends to control the speed of the motor based on the PWM, the speed of the motor becomes lowest when the duty is 0% and the speed of the motor becomes highest when the duty is 100%. Even though the PWM generation unit 105 applies the PWM of duty 100% to a motor 106, the speed of the motor may be controlled no longer when the speed of the motor 106 does not reach a reference speed 101. Generally, there are many cases in which the maximum speed of the motor 106 may be limited at the time of controlling the speed of the motor only with the duty value. That is, as the control results of the speed control unit 103, the maximum duty is physically 100% even though the duty over 100% comes out, such that the limiting unit 104 limits the duty value within a range of 0 to 100%. Therefore, there is a problem in that the efficiency of the motor may not be maximized.

RELATED ART DOCUMENT

Patent Document (Patent Document 1) Korean Patent Laid-Open Publication No. 10-2012-0076724 (Laid-Open Publication Date: Jul. 10, 2012)

(Patent Document 2) Korean Patent Laid-Open Publication No. 10-2010-0041794 (Laid-Open Publication Date: Apr. 22, 2010)

SUMMARY OF THE INVENTION

An object of the present invention is to provide a system and a method for controlling a speed of a motor capable of maximizing efficiency of a motor by simultaneously controlling a duty value and a phase value of current applied to a motor in controlling a speed of a motor.

According to an exemplary embodiment of the present invention, there is provided a system for controlling a speed of a motor, including: a speed measurement unit that receives a signal from a hall sensor mounted in the motor to measure a current speed of the motor; a comparison unit that compares the current speed of the motor measured by the speed measurement unit with a reference speed to calculate errors; a speed control unit that outputs a speed control value of the motor based on the errors calculated by the comparison unit; a limiting unit that limits the speed control value output from the speed control unit to values within a predetermined range; a duty control unit that controls a duty of current applied to the motor according to the values within the predetermined range limited by the limiting unit; a phase control unit that controls a phase of current applied to the motor according to the values within the predetermined range limited by the limiting unit; and a motor driving unit that generates a motor driving signal based on the duty control by the duty control unit and the phase control by the phase control unit and applies the generated motor driving signal to the motor.

The system for controlling a speed of a motor may further include: a control determination unit that determines the duty control or the phase control for controlling the speed of the motor based on the speed control value limited by the limiting unit and the signal from the hall sensor.

The phase control of current by the phase control unit may be performed by controlling the time when a direction in current starts to change based on the signal from the hall sensor.

The motor driving unit may include a first circuit unit and a second circuit unit that are connected with each other in parallel, in which the first circuit unit includes a first P channel type MOSFET and a first N channel type MOSFET that are connected with each other in series and the second circuit unit includes a second P channel type MOSFET and a second N channel type MOSFET that are connected with each other in series.

Diodes may be each mounted between respective source terminals and drain terminals of the first P channel type and N channel type MOSFETs and the second P channel type and N channel type MOSFETs.

According to another exemplary embodiment of the present invention, there is provided a method for controlling a speed of a motor by a system for controlling a speed of a motor including a speed measuring unit, a comparison unit, a speed control unit, a limiting unit, a duty control unit, a phase control unit, and a motor driving unit, the method including: a) receiving, by the speed measuring unit, a signal from a hall sensor mounted in the motor to measure a current speed of the motor; b) comparing, by a comparison unit, the current speed of the motor measured by the speed measurement unit with a reference speed to calculate errors; c) outputting, by the speed control unit, a speed control value of the motor based on the errors calculated by the comparison unit; d) limiting, by the limiting unit, the speed control value output from the speed control unit to values within a predetermined range; e) controlling, by the duty control unit, a duty of current applied to the motor according to the values within the predetermined range limited by the limiting unit; f) controlling, by the phase control unit, the phase of current applied to the motor according to the values within the predetermined range limited by the limiting unit; and g) generating, by a motor driving unit, a motor driving signal based on the duty control by the duty control unit or the phase control by the phase control unit and applying the generated motor driving signal to the motor.

The method for controlling a speed of a motor may further include: determining, by a control determination unit, a duty control or a phase control for controlling the speed of the motor based on the speed control value limited by the limiting unit and the signal from the hall sensor, among steps d) to f).

The phase control of current by the phase control unit in the step f) may be performed by controlling the time when a direction in current starts to change based on the signal from the hall sensor.

DESCRIPTION OF THE PREFERRED EMBODIMENTS

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

Throughout the specification, unless explicitly described otherwise, "comprising" any components will be understood to imply the inclusion of other components but not the exclusion of any other components. In addition, a term "part", "module", "unit", or the like, described in the specification means a unit of processing at least one function or operation and may be implemented by hardware or software or a combination of hardware and software.

Hereinafter, exemplary embodiments of the present invention will be described in detail with reference to the accompanying drawings.

Figure 1:
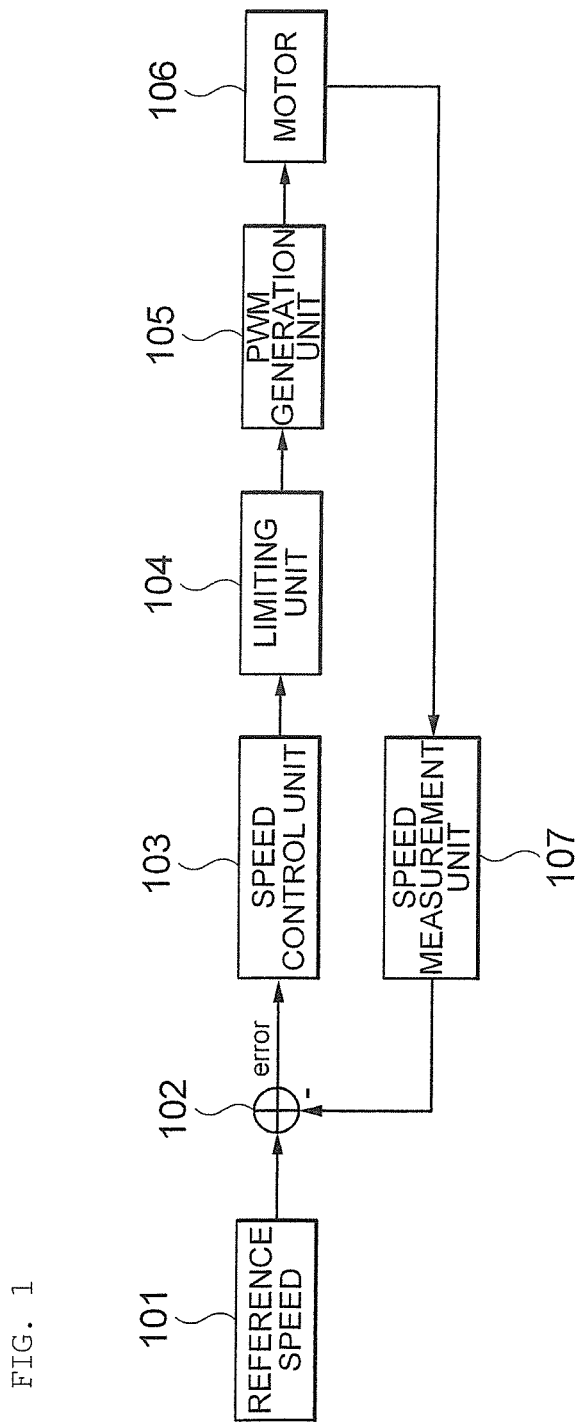
FIG. 1 is a diagram illustrating an example of a system for controlling a speed of a motor based on a closed loop control method according to the related art.
Figure 2:
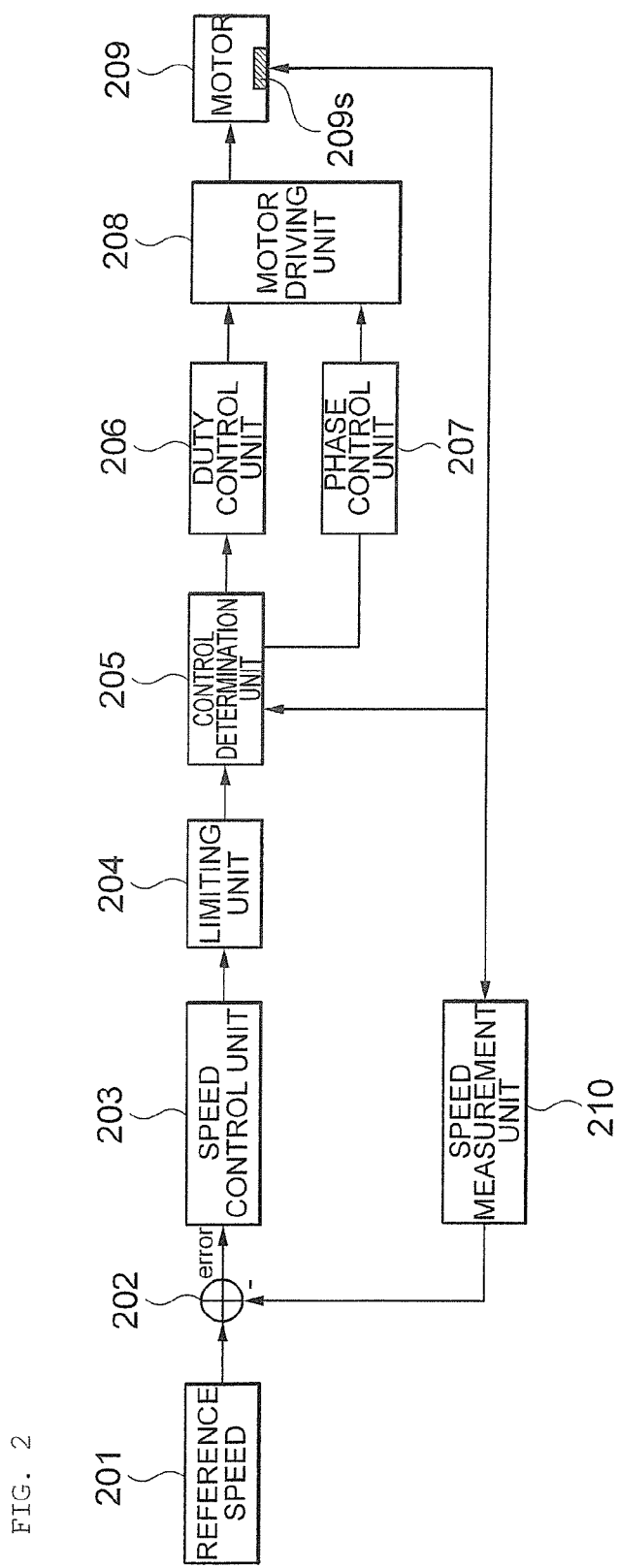
FIG. 2 is a diagram schematically illustrating a configuration of a system for controlling a speed of a motor according to an exemplary embodiment of the present invention.
Figure 3:
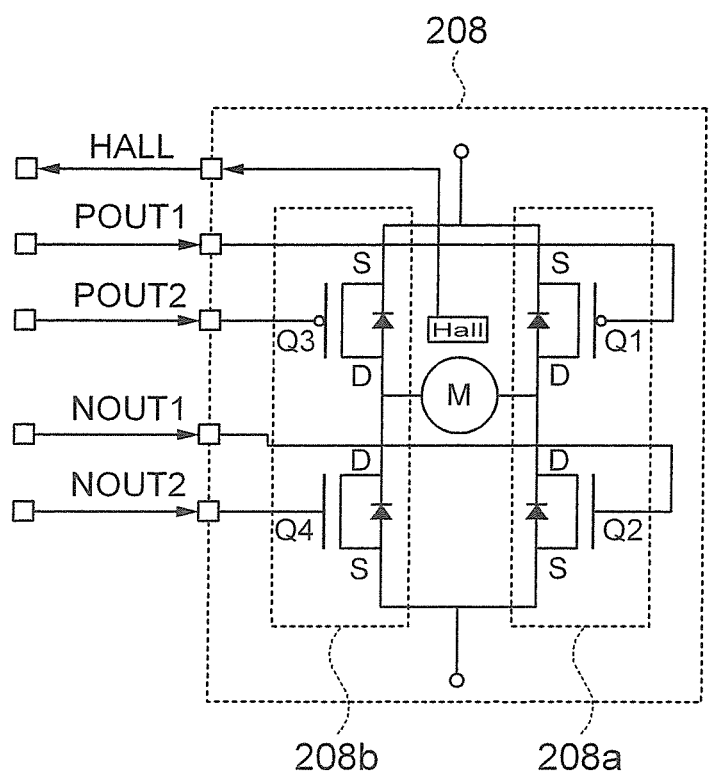
FIG. 3 is a diagram illustrating a configuration of an internal circuit of a motor driving unit of a system for controlling a speed of a motor illustrated in FIG. 2.

FIG. 2 is a diagram schematically illustrating a configuration of a system for controlling a speed of a motor according to an exemplary embodiment of the present invention.

Referring to FIG. 2, a system for controlling a speed of a motor according to the exemplary embodiment of the present invention is configured to include a speed measurement unit 210, a comparison unit 202, a speed control unit 203, a limiting unit 204, a duty control unit 206, a phase control unit 207, and a motor driving unit 208.

The speed measurement unit 210 receives a signal from a hall sensor 209s mounted in a motor 209 to measure a current speed of the motor 209.

The comparison unit 202 compares the current speed of the motor 209 measured by the speed measurement unit 210 with the reference speed to calculate errors.

The speed control unit 203 outputs a speed control value of the motor 209 based on the errors calculated by the comparison unit 202.

The limiting unit 204 limits the speed control value output by the speed control unit 203 to values within a predetermined range.

The duty control unit 206 controls a duty of current applied to the motor 209 according to the values within the predetermined range that are limited by the limiting unit 204.

The phase control unit 207 controls a phase of current applied to the motor 209 according to the values within a predetermined range that are limited by the limiting unit 204.

The motor driving unit 208 generates a motor driving signal based on a duty control by the duty control unit 206 and a phase control by the phase control unit 207 and applies the generated motor driving signal to the motor 209.

Here, the system for controlling a speed of a motor may further include a control determining unit 205 that determines the duty control or the phase control for controlling the speed of the motor 209 based on the speed control value limited by the limiting unit 204 and the signal from the hall sensor 209s.

Further, the phase control of current by the phase control unit 207 may be performed by controlling the time when a direction of current starts to change based on the signal from the hall sensor 209s.

In addition, the motor driving unit 208 includes a first circuit unit 208a and a second circuit unit 208b that are connected with each other in parallel. In this configuration, the first circuit unit 208a includes a first P channel type MOSFET Q1 and a first N channel type MOSFET Q2 that are connected with each other in series and the second circuit unit 208b includes a second P channel type MOSFET Q3 and a second N channel type MOSFET Q4 that are connected with each other in series.

Preferably, diodes are each disposed between respective source terminals and drain terminals of the first P channel type and N channel type MOSFETs Q1 and Q2 and the second P channel type and N channel type MOSFETs Q3 and Q4.

Hereinafter, the method for controlling a speed of a motor by the system for controlling a speed of a motor according to the exemplary embodiment of the present invention having the foregoing configuration will be described.

Figure 4:
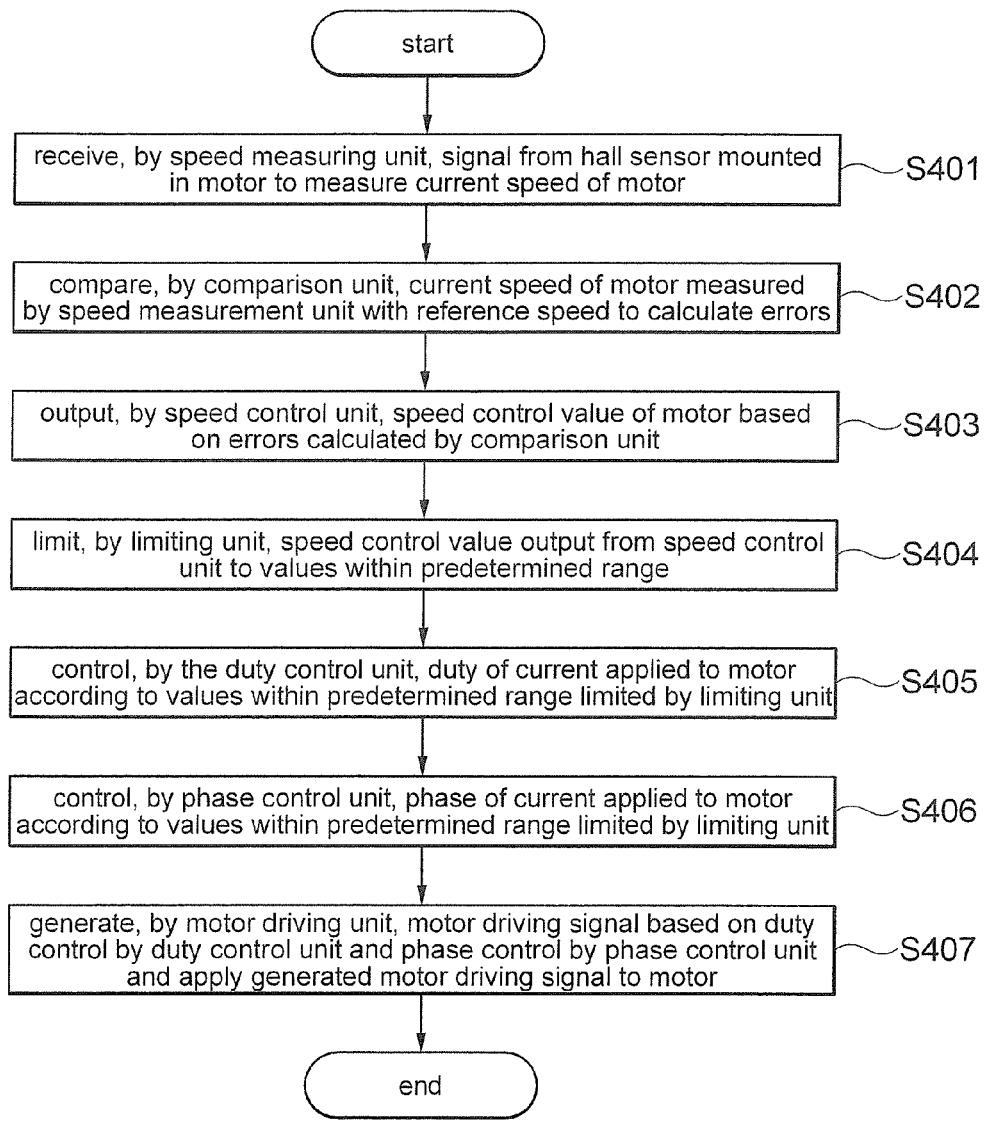
FIG. 4 is a flow chart illustrating a process for executing a method for controlling a speed of a motor according to an exemplary embodiment of the present invention.

FIG. 4 is a flow chart illustrating a process of executing a method for controlling a speed of a motor according to an exemplary embodiment of the present invention.

Referring to FIG. 4, the method for controlling a speed of a motor according to the exemplary embodiment of the present invention is the method for controlling a speed of a motor by the system for controlling a speed of a motor including the speed measurement unit 210, the comparison unit 202, the speed control unit 203, the limiting unit 204, the duty control unit 206, the phase control unit 207, and the motor driving unit 208 as described above. According to the method for controlling a speed of a motor according to the exemplary embodiment of the present invention, the speed measurement unit 210 first receives the signal from the hall sensor 209s that is mounted in the motor 209 so as to measure the current speed of the motor 209 (S401).

Next, the comparison unit 202 compares the current speed of the motor 209 measured by the speed measurement unit 210 with the preset reference speed 201 to calculate errors (S402).

Next, the speed control unit 203 outputs the speed control value of the motor based on the errors calculated by the comparison unit 202 (S403).

Further, the limiting unit 204 limits the speed control value output from the speed control unit 203 to the values within the predetermined range (S404).

Next, the duty control unit 206 controls the duty of current applied to the motor 209 according to the values within the predetermined range that are limited by the limiting unit 204 (S405).

Further, the phase control unit 207 controls the phase of current applied to the motor according to the values within a predetermined range that are limited by the limiting unit 204 (S406). In this case, the phase control of current by the phase control unit 207 may include controlling the time when the direction of current starts to change based on the signal from the hall sensor 209s.

Further, preferably, the method for controlling a speed of a motor may further include determining the duty control or the phase control for the control determining unit 205 to control the speed of the motor 209 based on the speed control value limited by the limiting unit 204 and the signal from the hall sensor 209s, among S404 to S406.

By doing so, when the duty control by the duty control unit 206 or the phase control by the phase control unit 207 are completed, the motor driving unit 208 generates the motor driving signal based on the duty control or the phase control and applies the generated motor driving signal to the motor 209 (S407). By performing the processes, the method for controlling a speed of a motor according to the exemplary embodiment of the present invention is completed.

Hereinafter, the method for controlling a speed of a motor according to the exemplary embodiment of the present invention as described above will be described in more detail.

Figure 5:
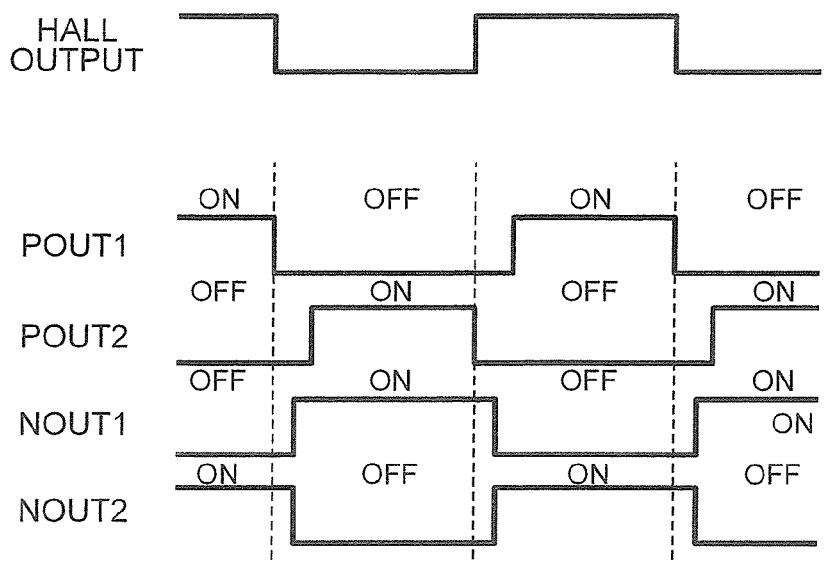
FIG. 5 is a diagram illustrating a driving signal pattern of a switch of a driving unit of a single phase BLDC motor using a hall sensor.

FIG. 5 is a diagram illustrating a driving signal pattern of a switch of a driving unit of a single phase BLDC motor using a hall sensor.

As illustrated in FIG. 5, signals POUT1, POUT2, NOUT1, and NOUT2 are changed based on the instant that the output HALL OUTPUT of the hall sensor is changed. The (commutation) phase control performed by the method of the present invention controls the time starting to commutate from high to low or from low to high based on the signal from the hall sensor. Generally, since the time delay is generated until the position signal is detected and the communication starts is generated and the change in current increases later as inductance of the motor even when voltage is changed, the speed of the motor may be fast when the commutation is performed (that is, when the 'high' or 'low' value of the pulse input signal is changed) before the signal from the hall signal is output.

Therefore, the method for controlling a speed of a motor according to the exemplary embodiment of the present invention is to maximize efficiency by simultaneously controlling the duty value and the phase value in controlling the speed of the motor.

In the related art, the limiting unit limits the duty value to 0 to 100%. According to the exemplary embodiment of the present invention, the upper limit of the limiting unit 204 may be set to be 100 or more in consideration of the control value of the phase control.

Figure 6A:
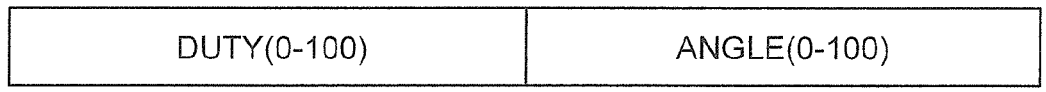
FIGS. 6A and 6B are diagrams conceptually illustrating an example of a combination of a duty control and a phase control.
Figure 6B:
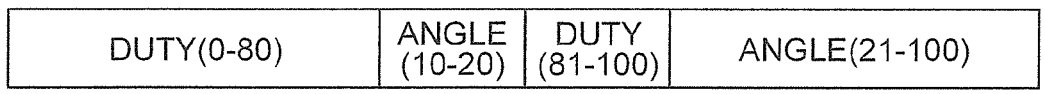

FIGS. 6A and 6B are diagrams conceptually illustrating an example of a combination of the duty control and the phase control.

FIG. 6A illustrates the case in which the duty is set to be 0 to 100 and the phase is set to be 0 to 100. FIG. 6B illustrates the case in which the limit range of the limiting unit 204 is set to be 0 to 200 and the duty value and the phase are combined. The combination method may set a preset value as a reference.

Figure 7:
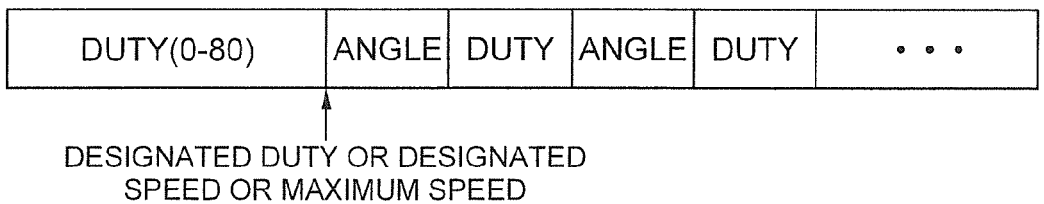
FIG. 7 is a diagram conceptually illustrating that a speed of a motor is controlled by alternately replacing a duty and a phase.

FIG. 7 is a diagram conceptually illustrating that the speed of the motor is controlled by alternately replacing a duty and a phase.

As illustrated in FIG. 7, the speed of the motor is first controlled only by using the duty value. Next, when the duty or the speed reaches the specific instant, the duty value is changed to the phase value and the speed is controlled. In this case, after the duty value and the initial value of the phase are appropriately set according to the characteristics of the motor, the speed of the motor is controlled as illustrated in FIG. 7.

Meanwhile, when the duty control and the phase control are performed according to the method of the present invention, the control may be performed by placing priority on any one of them. For example, when the priority is placed on the duty control, the duty is first adjusted to adjust the phase by 1 step when the motor reaches the maximum speed. Further, the duty is adjusted again. When the motor reaches the maximum speed, the phase is again adjusted 1 step. FIG. 7 is a diagram illustrating the control method as described above. When the phase value is adjusted using the duty value after the motor reaches the maximum speed (RPM), the motor may be faster.

As another example, when the priority is placed on the phase control, the phase is first adjusted, and then the duty value is adjusted when the speed of the motor reaches the reference speed or the maximum speed. In this case, when the speed of the motor is adjusted by first controlling the phase, the method for performing fine adjustment using the duty value is used if the speed of the motor does not reach the reference speed.

As described above, the method for controlling a speed of a motor according to the exemplary embodiments of the present invention can maximize the efficiency of the motor by simultaneously controlling the duty value and the phase value of current applied to the motor based on the duty value and the phase value used as the feedback value controlling the speed of the motor.

Further, the duty value and the phase value are also fed back to search the optimized phase value independent of the deviations in position of the rotor that are present at each sample of the signal from the hall sensor.

As set forth above, according to the exemplary embodiments of the present invention, it is possible to maximize the efficiency of the motor by simultaneously controlling the duty value and the phase value of current applied to the motor based on the duty value and the phase value that are used as the feedback value controlling the speed of the motor.

As described above, the present invention will be described with reference to the exemplary embodiments, but is not limited thereto. It can be apparent to those skilled in the art that the exemplary embodiments of present invention can be variously changed and applied within the scope of the present invention without departing from the technical idea of the present invention. Therefore, the protection scope of the present invention must be construed by the appended claims and it should be construed that all spirits within a scope equivalent thereto are included in the appended claims of the present invention.

What is claimed is:

1. A system for controlling a speed of a motor, comprising:

a speed measurement unit that receives a signal from a hall sensor mounted in the motor to measure a current speed of the motor;

a comparison unit that compares the current speed of the motor measured by the speed measurement unit with a reference speed to calculate errors;

a speed control unit that outputs a speed control value of the motor based on the errors calculated by the comparison unit;

a limiting unit that limits the speed control value output from the speed control unit to values within a predetermined range;

a duty control unit that controls a duty of current applied to the motor according to the values within the predetermined range limited by the limiting unit;

a phase control unit that controls a phase of current applied to the motor according to the values within the predetermined range limited by the limiting unit;

a motor driving unit that generates a motor driving signal based on the duty control by the duty control unit and the phase control by the phase control unit and applies the generated motor driving signal to the motor; and a control determination unit that determines the duty control or the phase control for controlling the speed of the motor based on the speed control value limited by the limiting unit and the signal from the hall sensor.

2. The system according to claim 1, wherein the phase control of current by the phase control unit is performed by controlling the time when a direction in current starts to change based on the signal from the hall sensor.

3. The system according to claim 1, wherein the motor driving unit includes a first circuit unit and a second circuit unit that are connected with each other in parallel, the first circuit unit including a first P channel type MOSFET and a first N channel type MOSFET that are connected with each other in series and the second circuit unit including a second P channel type MOSFET and a second N channel type MOSFET that are connected with each other in series.

4. The system according to claim 3, wherein diodes are each mounted between respective source terminals and drain terminals of the first P channel type and N channel type MOSFETs and the second P channel type and N channel type MOSFETs.

5. A method for controlling a speed of a motor by a system for controlling a speed of a motor including a speed measuring unit, a comparison unit, a speed control unit, a limiting unit, a duty control unit, a phase control unit, and a motor driving unit, the method comprising:

a) receiving, by the speed measuring unit, a signal from a hall sensor mounted in the motor to measure a current speed of the motor;

b) comparing, by a comparison unit, the current speed of the motor measured by the speed measurement unit with a reference speed to calculate errors;

c) outputting, by the speed control unit, a speed control value of the motor based on the errors calculated by the comparison unit;

d) limiting, by the limiting unit, the speed control value output from the speed control unit to values within a predetermined range;

e) controlling, by the duty control unit, a duty of current applied to the motor according to the values within the predetermined range limited by the limiting unit;

f) controlling, by the phase control unit, the phase of current applied to the motor according to the values within the predetermined range limited by the limiting unit; and g) generating, by a motor driving unit, a motor driving signal based on the duty control by the duty control unit and the phase control by the phase control unit and applying the generated motor driving signal to the motor, wherein the method further comprising determining, by a control determination unit, a duty control or a phase control for controlling the speed of the motor based on the speed control value limited by the limiting unit and the signal from the hall sensor, among steps d) to f).

6. The method according to claim 5, wherein the phase control of current by the phase control unit in the step f) is performed by controlling the time when a direction in current starts to change based on the signal from the hall sensor.

7. The method according to claim 5, wherein when the duty control in the step e) and the phase control in the step f) are performed, the control is performed by placing priority on any one of the duty control and the phase control.

8. The method according to claim 7, wherein if the priority is placed on the duty control, the control is performed by a method for first adjusting the duty to control the phase by 1 step when the motor reaches a maximum speed and again adjusting the phase by 1 step when the motor reaches the maximum speed after the duty is adjusted again.

9. The method according to claim 7, wherein if the priority is placed on the phase control, the control is performed by a method for first adjusting the phase to adjust the duty value when the speed of the motor reaches a reference speed or the maximum speed.

10. The method according to claim 9, wherein when the speed of the motor is adjusted by first adjusting the phase, the control is performed by a method for performing fine adjustment using the duty value if the speed of the motor does not reach the reference speed.

* * * * *